(12) United States Patent
Sekiyama

(10) Patent No.: US 10,382,865 B2
(45) Date of Patent: Aug. 13, 2019

(54) WIRELESS COMMUNICATIONS DEVICE AND METHOD OF CONTROLLING WIRELESS COMMUNICATIONS DEVICE

(71) Applicant: Icom Incorporated, Osaka (JP)

(72) Inventor: Yoshio Sekiyama, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 16/212,079

(22) Filed: Dec. 6, 2018

(65) Prior Publication Data

US 2019/0191244 A1 Jun. 20, 2019

(30) Foreign Application Priority Data

Dec. 19, 2017 (JP) ................................. 2017-243175

(51) Int. Cl.
*H04R 3/04* (2006.01)
*G01P 15/08* (2006.01)
*G06F 3/01* (2006.01)

(52) U.S. Cl.
CPC ................ *H04R 3/04* (2013.01); *G01P 15/08* (2013.01); *G06F 3/017* (2013.01); *H04R 2499/11* (2013.01)

(58) Field of Classification Search
CPC ....... H04R 3/04; H04R 2499/11; G01P 15/08; G06F 3/017
See application file for complete search history.

(56) References Cited

U.S. PATENT DOCUMENTS

| | | | |
|---|---|---|---|
| 2010/0265137 A1 | 10/2010 | Ono | |
| 2016/0094250 A1* | 3/2016 | Mujtaba | ............... H04B 7/0808 455/552.1 |

FOREIGN PATENT DOCUMENTS

JP 2010-258490 A 11/2010

* cited by examiner

*Primary Examiner* — Andrew L Sniezek
(74) *Attorney, Agent, or Firm* — Mintz Levin Cohn Ferris Glovsky and Popeo, P.C.; David G. Conlin; Steven M. Jensen

(57) ABSTRACT

An angle calculator calculates, based on acceleration detected by an acceleration sensor, a tilt angle of a transceiver with respect to the vertical direction. A selector (i) selects a first audio filter to operate if the tilt angle is less than a threshold angle, or (ii) selects a second audio filter to operate if the tilt angle is equal to or greater than the threshold angle. The second audio filter has a lower cutoff frequency that is higher than the lower cutoff frequency of the first audio filter.

8 Claims, 3 Drawing Sheets

FIG. 2A
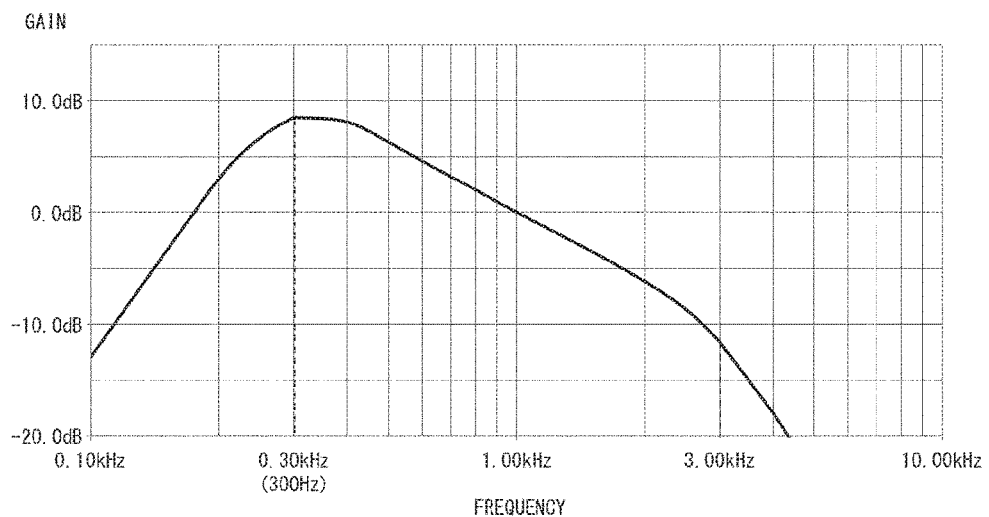
FIG. 2B
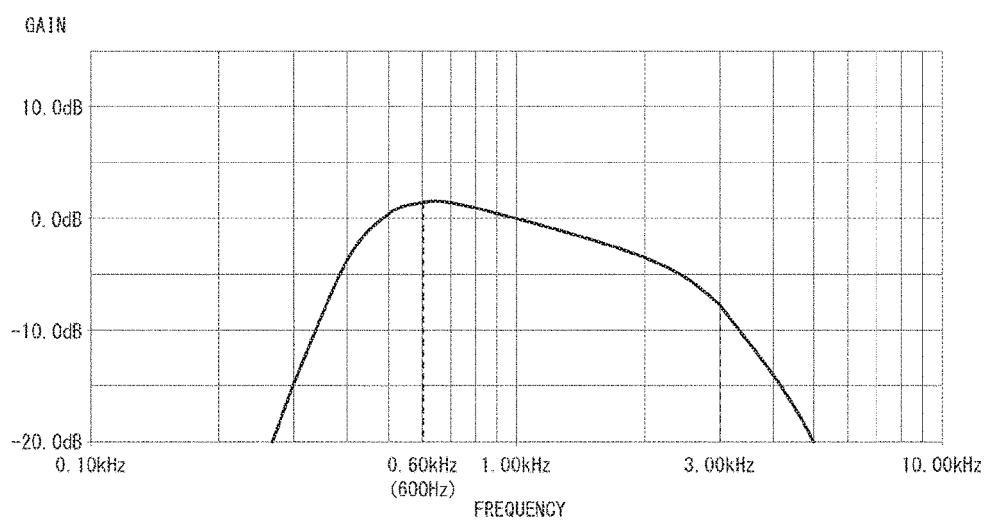
FIG. 3A
TABLE1
| SQL LEVEL | LV1 | LV2 | LV3 | LV4 | LV5 | LV6 |
|---|---|---|---|---|---|---|
| SQL SENSITIVITY | 15 | 14 | 13 | 12 | 11 | 10 |

TABLE2

| SQL LEVEL | LV1 | LV2 | LV3 | LV4 | LV5 | LV6 |
|---|---|---|---|---|---|---|
| SQL SENSITIVITY | 17 | 16 | 15 | 14 | 13 | 12 |

WIRELESS COMMUNICATIONS DEVICE AND METHOD OF CONTROLLING WIRELESS COMMUNICATIONS DEVICE

This Nonprovisional application claims priority under 35 U.S.C. § 119 on Patent Application No. 2017-243175 filed in Japan on Dec. 19, 2017, the entire contents of which are hereby incorporated by reference.

TECHNICAL FIELD

One or more embodiments of the present invention relate to a wireless communications device.

BACKGROUND ART

It is known that, when a wireless communications device (e.g., transceiver) is tilted from its upright position, a reception sensitivity of the wireless communications device may be deteriorated. For example, Patent Literature 1 discloses a technique to prevent such a deterioration of reception sensitivity. An antenna device of Patent Literature 1 includes two antennas (first antenna and second antenna) which are tilted at different angles to the vertical direction.

CITATION LIST

Patent Literature

[Patent Literature 1]
Japanese Patent Application Publication Tokukai No. 2010-258490

SUMMARY OF INVENTION

Technical Problem

An object of one or more embodiments of the present invention is to prevent, with a configuration simpler than conventional configurations, a deterioration of reception sensitivity that would result from a change in attitude of a wireless communications device.

Solution to Problem

In order to attain the above object, a wireless communications device according to one or more embodiments of the present invention includes: an acceleration sensor configured to detect acceleration; an angle calculator configured to calculate, based on the acceleration, a tilt angle of the wireless communications device with respect to a vertical direction; a first audio filter and a second audio filter which have respective different frequency characteristics, the second audio filter having a lower cutoff frequency that is higher than a lower cutoff frequency of the first audio filter; and a selector configured to carry out selection of which one of the first and second audio filters to operate, the selector being configured to select the first audio filter if the tilt angle is less than a predetermined threshold angle, and select the second audio filter if the tilt angle is equal to or greater than the predetermined threshold angle.

In order to attain the above object, in a method of controlling a wireless communications device according to one or more embodiments of the present invention, the wireless communications device includes: an acceleration sensor configured to detect acceleration; and a first audio filter and a second audio filter which have respective different frequency characteristics, the second audio filter having a lower cutoff frequency that is higher than a lower cutoff frequency of the first audio filter, and the method includes: an angle calculating step including calculating, based on the acceleration, a tilt angle of the wireless communications device with respect to a vertical direction; and a selecting step including carrying out selection of which one of the first and second audio filters to operate, the selecting step including selecting the first audio filter if the tilt angle is less than a predetermined threshold angle, and selecting the second audio filter if the tilt angle is equal to or greater than the predetermined threshold angle.

Advantageous Effects of Invention

According to one or more embodiments of the present invention, it is possible, with a configuration simpler than conventional configurations, to prevent a deterioration of reception sensitivity that would result from a change in attitude of a wireless communications device.

BRIEF DESCRIPTION OF DRAWINGS

FIG. 2A illustrates one example of a frequency characteristic of a first audio filter. FIG. 2B illustrates one example of a frequency characteristic of a second audio filter.

FIG. 3A illustrates one example of a first squelch table.

DESCRIPTION OF EMBODIMENTS (Overview of Transceiver 1)

Figure 1:
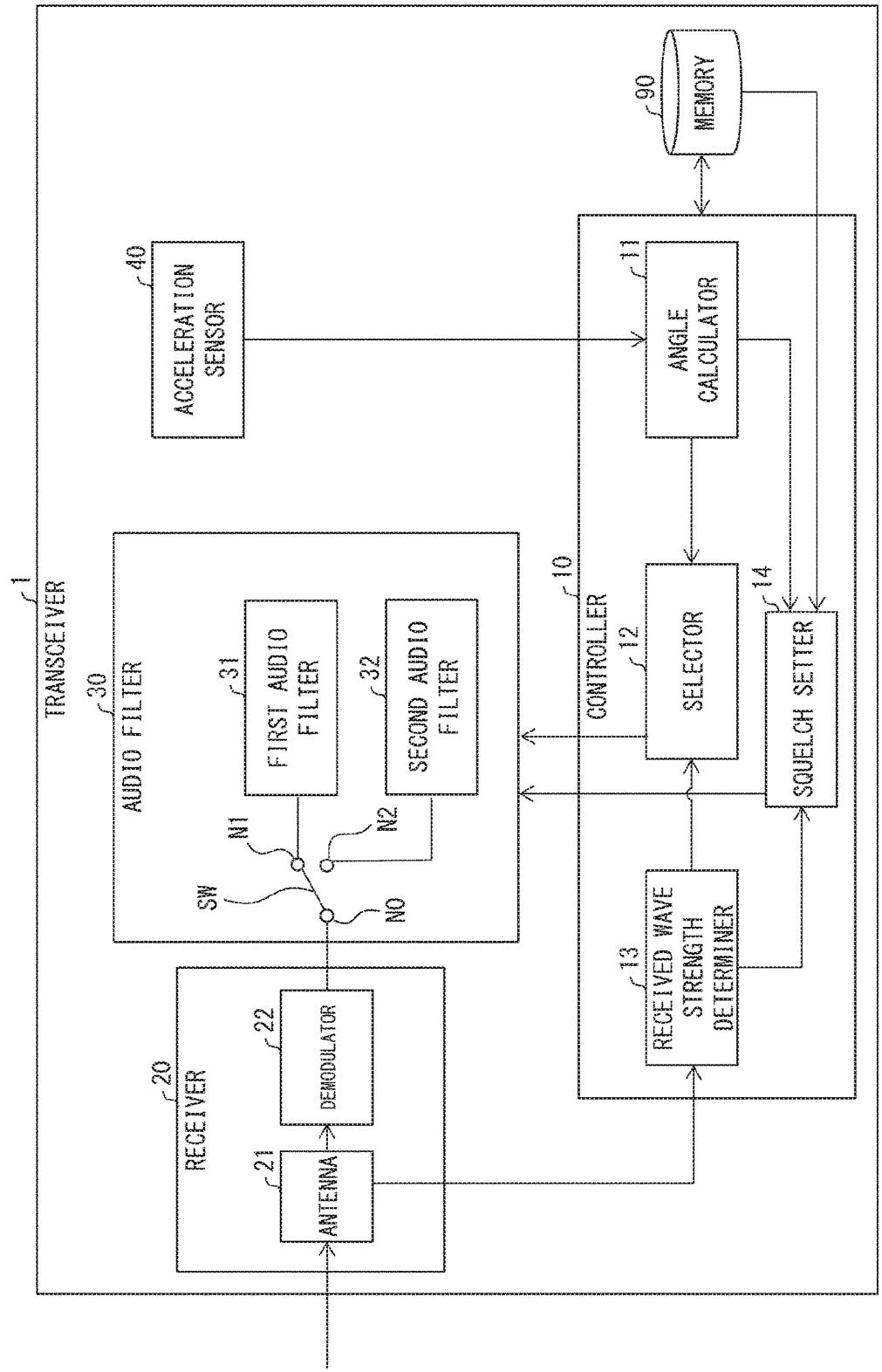
FIG. 1 is a functional block diagram illustrating a main part of a transceiver according to one or more embodiments.

FIG. 1 is a functional block diagram illustrating a main part of a transceiver 1 (wireless communications device) of Embodiment 1. The following description will first discuss an overview of the transceiver 1. The following description may omit matters which are not related to Embodiment 1. Such matters not described here are the same as those of known techniques.

The transceiver 1 is one example of a hand-held (portable) wireless communications device. Note, however, that the wireless communications device according to one or more embodiments of the present invention is not limited to a portable wireless communications device, and may be a desktop wireless communications device, provided that the attitude (tilt angle) of the wireless communications device is changeable by a user's operation.

The transceiver 1 includes a controller 10, a receiver 20, an audio filter 30, an acceleration sensor 40, and a memory 90. The controller 10 controls the receiver 20, the audio filter 30, the acceleration sensor 40, the memory 90, and the like of the transceiver 1 in an integrated manner. The controller 10 includes an angle calculator 11, a selector 12, a received wave strength determiner 13, and a squelch setter 14. Specific operations of the angle calculator 11, the selector 12, the received wave strength determiner 13, and the squelch setter 14 of the controller 10 will be described later.

Each function of the controller 10 may be realized by execution, by a central processing unit (CPU), of a program stored in the memory 90. The memory 90 stores various programs to be executed by the controller 10, and data to be used by the programs. The memory 90 stores therein TABLE 1 (first squelch table) and TABLE 2 (second squelch table), which will be described later (see FIGS. 3A and 3B described later).

The receiver 20 includes an antenna 21 and a demodulator 22. The antenna 21 receives a radio wave (radio signal) transmitted by an external wireless communications device (a wireless communications device other than the transceiver 1). The antenna 21 is, for example, a whip antenna. In Embodiment 1, the radio wave that the antenna 21 receives is a wave that carries an audio signal indicative of a speech sound from a user (speaker person) of the external wireless communications device. That is, the radio wave that the antenna 21 receives contains an audio signal that has been modulated in a certain modulation scheme. The antenna 21 converts the received radio wave into a wired signal (electrical signal). The antenna 21 supplies the wired signal to the demodulator 22 and to the received wave strength determiner 13.

The demodulator 22 demodulates the wired signal obtained from the antenna 21 through a known demodulating process. It follows that the demodulator 22 extracts the audio signal from the wired signal. The demodulator 22 is connected to a contact N0 (input contact) of a switch SW (described later) of the audio filter 30. The demodulator 22 supplies the audio signal to a first audio filter 31 (described later) or to a second audio filter 32 (described later) via the switch SW.

The acceleration sensor 40 detects acceleration applied to the transceiver 1. Specifically, the acceleration sensor 40 detects acceleration along each of the three orthogonal axes: X axis; Y axis; and Z axis. In Embodiment 1, it is assumed that Z axis is parallel to the vertical direction, and that the positive Z direction is the direction of gravitational force (downward vertical direction).

The acceleration sensor 40 supplies, to the controller (more specifically, to the angle calculator 11), the acceleration detected by the acceleration sensor 40 (i.e., detected acceleration). The controller 10 is capable of detecting the horizontal plane (plane perpendicular to the Z direction, i.e., XY plane) on the basis of the acceleration detected by the acceleration sensor 40.

(Audio Filter 30)

The audio filter 30 includes the first audio filter 31, the second audio filter 32, and the switch SW. The first audio filter 31 and the second audio filter 32 are each configured to carry out filtering (frequency filtering) of the audio signal. The first audio filter 31 and the second audio filter 32 have different frequency characteristics (frequency filtering characteristics), as described below.

The audio signal, which has been subjected to the filtering by the audio filter 30 (the first audio filter 31 or the second audio filter 32), is output through a speaker (not illustrated). This makes it possible for a user of the transceiver 1 to hear the speech sound from the speaker person.

The switch SW includes (i) the input contact N0 and (ii) output contacts N1 and N2. The contact N1 is connected to the first audio filter 31. The contact N2 is connected to the second audio filter 32.

The switch SW causes the contact N0 to selectively connect to either one of the contacts N1 and N2. FIG. 1 exemplarily illustrates a case in which the contact N0 is connected to the contact N1. In this case, the demodulator 22 is able to supply the audio signal to the first audio filter 31 via the switch SW. That is, it is possible to cause the first audio filter 31 to carry out filtering of the audio signal.

On the other hand, in a case where the contact N0 is connected to the contact N2, the demodulator 22 is able to supply the audio signal to the second audio filter 32 via the switch SW. That is, it is possible to cause the second audio filter 32 to carry out filtering of the audio signal.

FIGS. 2A and 2B show graphs illustrating examples of the respective frequency characteristics of the first audio filter 31 and the second audio filter 32. FIG. 2A illustrates one example of the frequency characteristic of the first audio filter 31. FIG. 2B illustrates one example of the frequency characteristic of the second audio filter 32. In the graphs of FIGS. 2A and 2B, the horizontal axis indicates frequency (frequency of audio signal), whereas the vertical axis indicates gain.

The first audio filter 31 and the second audio filter 32 are substantially equal in their high-frequency cutoff characteristics. In the examples shown in FIGS. 2A and 2B, the first audio filter 31 and the second audio filter 32 have the same upper cutoff frequency. In Embodiment 1, the upper cutoff frequency of the first audio filter 31 and the upper cutoff frequency of the second audio filter 32 are each 3 kHz.

Note, however, that the upper cutoff frequencies of the first audio filter 31 and the second audio filter 32 are not limited to the examples described above, provided that the upper cutoff frequencies of the first audio filter 31 and the second audio filter 32 are such that high-frequency components of audio signals are cut off in a suitable manner.

On the other hand, the first audio filter 31 and the second audio filter 32 differ significantly from each other in their low-frequency cutoff characteristics. Specifically, the lower cutoff frequency of the second audio filter 32 is higher than the lower cutoff frequency of the first audio filter 31. In Embodiment 1, the lower cutoff frequency of the first audio filter 31 is 300 Hz, whereas the lower cutoff frequency of the second audio filter 32 is 600 Hz.

Note, however, that the lower cutoff frequencies of the first audio filter 31 and the second audio filter 32 are not limited to the examples described above, provided that the lower cutoff frequency of the first audio filter 31 is such that low-frequency components of audio signals are cut off in a suitable manner and provided that the lower cutoff frequency of the second audio filter 32 is such that tone signals (described later) are cut off in a suitable manner.

The first audio filter 31 is a general audio filter (usual audio filter). The frequency characteristic of the first audio filter 31 is similar to that of a general audio filter. The first audio filter 31 may be referred to as a normal audio filter. It should be noted that each country has standards for maritime radiocommunication equipment, which specify the band of an audio signal to be 300 Hz to 3 kHz. The lower cutoff frequency and the upper cutoff frequency of the first audio filter 31 in Embodiment 1 are selected in accordance with the standards.

On the other hand, the second audio filter 32 has a frequency characteristic that is suitable for squelching. Specifically, the second audio filter 32 is an audio filter for Continuous Tone-Coded Squelch System (CTCSS). The second audio filter 32 may be referred to as a CTCSS audio filter. The second audio filter 32 has a squelch function (more specifically, tone squelch function).

The lower cutoff frequency (600 Hz) of the second audio filter 32 is selected so that tone signals having a frequency of, for example, 254.1 Hz (one example of a predetermined tone frequency) are cut off. The second audio filter 32 is capable of cutting off tone signals more effectively than the first audio filter 31. The second audio filter 32 makes it possible to carry out tone squelch in a suitable manner.

(Angle Calculator 11 and Selector 12)

The angle calculator 11 calculates, based on the acceleration detected by the acceleration sensor 40, the tilt angle (hereinafter referred to as tilt angle $\theta$) of the transceiver 1 with respect to the vertical direction (Z direction) (this step is angle calculating step). The calculation of the tilt angle by the angle calculator 11 may be carried out through a known algorithm.

In a case where the transceiver 1 is in its upright position (for example, in a case where the longer dimension direction of the transceiver 1 is orthogonal to the horizontal plane), the tilt angle θ is 0°. It is assumed here that, when the transceiver 1 is in its upright position, the antenna 21 is in its upright position with its tip facing in the negative Z direction (i.e., upward vertical direction). That is, it is assumed here that, when the transceiver 1 is in its upright position, the attitude of the transceiver 1 is such that the antenna 21 is able to receive radio waves most effectively. In a case where the transceiver 1 is used by a user in a hand-held manner, the tilt angle θ is expected to be small enough, that is, expected to be approximately equal to 0°.

On the other hand, in a case where the transceiver 1 is positioned parallel to the horizontal plane (e.g., in a case where the transceiver 1 is laid on its side), the tilt angle θ is 90°. For example, in a case where the transceiver 1 is laid on its side on a desk by a user, the tilt angle θ is 90°. In a case where the transceiver 1 is laid on its side in this manner, the reception sensitivity of the antenna 21 is less than when the transceiver 1 is in the upright position.

In this way, a large tilt angle θ may result in a deterioration of the antenna 21's reception sensitivity, as compared to cases of small tilt angles θ. In order to solve such an issue, the inventor has arrived at a configuration of the transceiver 1.

The selector 12 selects which of the first and second audio filters 31 and 32 to operate (this step is selecting step). Specifically, the selector 12 selects, based on the magnitude of the tilt angle θ, which of the first and second audio filters 31 and 32 to operate. For example, the selector 12 selects, based on the magnitude relationship between the tilt angle θ and a predetermined threshold angle (hereinafter referred to as threshold angle θth), which of the first and second audio filters 31 and 32 to operate. Specifically, the selector 12 generates, based on the magnitude relationship between the tilt angle θ and the predetermined threshold angle θth, a signal that is indicative of a point to be connected with the contact N0 of the switch SW (this signal is referred to as connection setting signal).

For example, the selector 12 determines whether or not the tilt angle θ is less than the predetermined threshold angle θth. If it is determined that the tilt angle θ is less than the predetermined threshold angle θth, the selector 12 selects the first audio filter 31 to operate. Specifically, the selector 12 generates a connection setting signal so that the contact N0 of the switch SW is connected to the contact N1 in accordance with the connection setting signal (hereinafter referred to as first connection setting signal). The selector 12 supplies the generated first connection setting signal to the switch SW. This makes it possible to supply an audio signal from the demodulator 22 to the first audio filter 31 via the switch SW. That is, this makes it possible to select the first audio filter 31 to operate.

On the other hand, if it is determined that the tilt angle θ is equal to or greater than the predetermined threshold angle θth, the selector 12 selects the second audio filter 32 to operate. Specifically, the selector 12 generates a connection setting signal so that the contact N0 of the switch SW is connected to the contact N2 in accordance with the connection setting signal (hereinafter referred to as second connection setting signal). The selector 12 supplies the generated second connection setting signal to the switch SW. This makes it possible to supply an audio signal from the demodulator 22 to the second audio filter 32 via the switch SW. That is, this makes it possible to select the second audio filter 32 to operate.

The threshold angle θth may be predetermined by a designer of the transceiver 1, or may be changeable by a user of the transceiver 1. Examples of the value of the threshold angle θth include 30°, 60°, and 90°. It follows that the range of the value of the threshold angle θth may be, for example, not smaller than 30° and not greater than 90° (i.e., 30°≤θth≤90°). Note, however, that the above values of the threshold angle θth are non-limited examples.

The selector 12 is capable of causing one of the first and second audio filters 31 and 32 to operate, depending on the magnitude of the tilt angle θ (i.e., the attitude of the transceiver 1). Specifically, the selector 12 is capable of causing the second audio filter 32 to operate when the tilt angle θ is equal to or greater than the threshold angle θth.

As described earlier, the lower cutoff frequency (600 Hz) of the second audio filter 32 (CTCSS audio filter) is higher than the lower cutoff frequency (300 Hz) of the first audio filter 31 (normal audio filter). The second audio filter 32 therefore is capable of filtering out noise contained in audio signals more effectively than the first audio filter 31.

As such, if the tilt angle θ is large (i.e., if θ≥θth) (that is, when the reception sensitivity of the antenna 21 is deteriorated due to a change in attitude of the transceiver 1), the second audio filter 32 is selected to operate, and thereby noise can be filtered out effectively. It follows that, even when the reception sensitivity of the antenna 21 is deteriorated, it is still possible to provide, to a user, audio signals that are easy to hear to the user. That is, it is possible to effectively reduce a deterioration of measured (apparent) reception sensitivity. As is clear from this, the second audio filter 32 can be said to be an audio filter that has a frequency characteristic suited for reducing a deterioration of measured reception sensitivity.

As has been described, according to the transceiver 1, it is possible to prevent a deterioration of reception sensitivity that would result from a change in attitude of a wireless communications device, without having to provide two (i.e., a plurality of) antennas to the wireless communications device, unlike the technique of Patent Literature 1. That is, it is possible, with a configuration simpler than conventional configurations, to prevent a deterioration of reception sensitivity that would result from a change in attitude of a wireless communications device.

(Received Wave Strength Determiner 13)

By the way, the audio filter selection based on the tilt angle θ is not essential. For example, assume that a radio wave supplied to the antenna 21 is strong enough. In this case, it is inferred that, even if the tilt angle θ is large (i.e., even when the reception sensitivity of the antenna 21 is deteriorated due to a change in attitude of the transceiver 1), the radio wave received by the antenna 21 is strong to the extent that allows a user to sufficiently hear audio signals. Thus, it is not necessary to cause the second audio filter 32 to operate in such a case.

As such, for example, in some embodiments, in order to reduce power consumed by the transceiver 1, the following configuration may be employed: the selector 12 carries out the audio filter selection based on the tilt angle θ only when it appears better to reduce a deterioration of reception sensitivity.

In view of this, the received wave strength determiner 13 controls the selector 12 according to the strength (hereinafter referred to as strength RSSIV) of a radio wave received by the antenna 21. For example, the received wave strength determiner 13 controls the selector 12 based on the magnitude relationship between the strength RSSIV and a predetermined threshold strength (hereinafter referred to as threshold strength RSSIVth).

Specifically, the received wave strength determiner 13 generates a signal that controls the selector 12 (this signal is referred to as selection control signal), based on the magnitude relationship between the strength RSSIV and the predetermined threshold strength RSSIVth. For example, the received wave strength determiner 13 determines whether or not the strength RSSIV is equal to or less than the threshold strength RSSIVth.

If it is determined that the strength RSSIV is equal to or less than the threshold strength RSSIVth (the strength of radio wave received by the antenna 21 is equal to or less than the threshold strength), the received wave strength determiner 13 generates a selection control signal that permits the selector 12 to carry out audio filter selection based on the tilt angle θ (this selection control signal is hereinafter referred to as first selection control signal). The received wave strength determiner 13 supplies the generated first selection control signal to the selector 12.

On the other hand, if it is determined that the strength RSSIV is greater than the threshold strength RSSIVth (the strength of radio wave received by the antenna 21 is greater than the threshold strength), the received wave strength determiner 13 generates a selection control signal that stops the selector 12 to carry out audio filter selection based on the tilt angle θ (this selection control signal is hereinafter referred to as second selection control signal). The received wave strength determiner 13 supplies the generated second selection control signal to the selector 12.

According to the transceiver 1, the following configuration can be achieved: the selector 12 carries out the audio filter selection based on the tilt angle θ only when it appears better to reduce a deterioration of reception sensitivity (i.e., only when RSSIV RSSIVth).

(Squelch Setter 14)

The squelch setter 14 sets the squelch sensitivity (hereinafter referred to as SQL sensitivity) for the second audio filter 32 (this step is squelch setting step). For example, the squelch setter 14 references a squelch table stored in the memory 90 to set the SQL sensitivity.

Figure 3B:
FIG. 3B illustrates one example of a second squelch table.

FIGS. 3A and 3B show examples of squelch tables in Embodiment 1. FIG. 3A illustrates one example of TABLE 1 (first squelch table). FIG. 3B illustrates one example of TABLE 2 (second squelch table). Each squelch table contains SQL sensitivities corresponding to respective squelch levels (hereinafter referred to as SQL levels) (e.g., six levels: LV1 to LV6).

As shown in FIGS. 3A and 3B, each squelch table is set such that the SQL sensitivity decreases as the SQL level increases. The SQL level can be selected by a user of the transceiver 1 when the user operates the transceiver 1. For example, a user can select the SQL level by carrying out a certain input operation via an input section (not illustrated). The squelch setter 14 selects an SQL sensitivity, from a squelch table, that corresponds to the SQL level selected by the user.

The SQL sensitivities corresponding to the respective SQL levels in TABLE 2 are higher than those of TABLE 1. This means that the SQL sensitivity that corresponds to the SQL level selected by a user (e.g., LV1) is higher (that is, the squelch is easier to open) when TABLE 2 is used than when TABLE 1 is used. Note that the expression "SQL sensitivity is higher" is equivalent to "squelch is easier to open" (the squelch is opened under a condition that the strength of the received radio wave is low), and that the expression "SQL sensitivity is lower" is equivalent to "squelch is tighter" (the squelch is not opened under the condition that the strength of the received radio wave is low).

The squelch setter 14 selects one of the squelch tables TABLE 1 and TABLE 2, based on the selection carried out by the selector 12 based on the determination by the received wave strength determiner 13 and the determination by the angle calculator 11. Specifically, upon selection of the second audio filter 32 by the selector 12 based on the determination by the received wave strength determiner 13 and the determination by the angle calculator 11, the squelch setter 14 selects TABLE 2. That is, if the condition "RSSIV RSSIVth, and θ≥θth" is satisfied, the squelch setter 14 selects TABLE 2. In this case, the squelch setter 14 references TABLE 2 to set the SQL sensitivity.

On the other hand, if at least one of the conditions "RSSIV>RSSIVth" and "θ<θth" is satisfied, the squelch setter 14 selects TABLE 1. In this case, the squelch setter 14 references TABLE 1 to set the SQL sensitivity.

As described above, the squelch setter 14 is configured such that a higher SQL sensitivity is selected when the condition "RSSIV RSSIVth, and θ≥θth" is satisfied than when at least one of the conditions "RSSIV>RSSIVth" and "θ<θth" is satisfied.

As such, noise is filtered off by the second audio filter 32 when it appears better to reduce a deterioration of reception sensitivity, and thereby measured reception sensitivity is improved. Furthermore, since the SQL sensitivity is increased (looser squelch is selected) in addition to the improvement in the measured reception sensitivity, a user is given a feeling that the reception sensitivity is further improved. That is, it is possible to provide, to a user, audio signals that are easier to hear to the user. It follows that it is possible to more effectively reduce a deterioration of measured reception sensitivity.

[Software Implementation Example]

Control blocks of the transceiver 1 (particularly, the controller 10) can be realized by a logic circuit (hardware) provided in an integrated circuit (IC chip) or the like or can be alternatively realized by software.

In the latter case, the transceiver 1 includes a computer that executes instructions of a program that is software realizing the foregoing functions. The computer includes, for example, one or more processors and also includes a computer-readable storage medium that stores the program therein. An object of one or more embodiments of the present invention can be achieved by the one or more processors in the computer reading and executing the program stored in the storage medium. Examples of the one or more processors include central processing units (CPUs). Examples of the storage medium include "a non-transitory tangible medium" such as a tape, a disk, a card, a semiconductor memory, and a programmable logic circuit, as well as read only memories (ROMs). The transceiver 1 may further include a random access memory (RAM) or the like in which the program is loaded. The program can be supplied to or made available to the computer via any transmission medium (such as a communication network or a broadcast wave) which allows the program to be transmitted. Note that one or more embodiments of the present invention can also be achieved in the form of a computer data signal in which the program is embodied via electronic transmission and which is embedded in a carrier wave.

[Recap]

A wireless communications device according to one or more embodiments of the present invention is a wireless communications device including: an acceleration sensor configured to detect acceleration; an angle calculator configured to calculate, based on the acceleration, a tilt angle of the wireless communications device with respect to a vertical direction; a first audio filter and a second audio filter which have respective different frequency characteristics, the second audio filter having a lower cutoff frequency that is higher than a lower cutoff frequency of the first audio filter; and a selector configured to carry out selection of which one of the first and second audio filters to operate, the selector being configured to select the first audio filter if the tilt angle is less than a predetermined threshold angle, and select the second audio filter if the tilt angle is equal to or greater than the predetermined threshold angle.

The above configuration makes it possible to cause one of the following audio filters to operate: the first audio filter (foregoing normal audio filter); and the second audio filter (foregoing CTCSS audio filter), depending on the tilt angle (attitude of the wireless communications device).

As such, it is possible, when the wireless communications device is in an attitude that causes a deterioration of reception sensitivity (when the tilt angle is equal to or greater than the threshold angle), to cause an audio filter having a frequency characteristic suitable for reducing a deterioration of measured (apparent) reception sensitivity (i.e., the second audio filter whose lower cutoff frequency is higher than the other) to operate. This makes it possible to provide a user with high sensitivity even in a case where the tilt angle is large (e.g., even when the wireless communications device is laid on its side). This in turn makes it possible, with a simpler configuration than conventional configurations, to prevent a deterioration of reception sensitivity that would result from a change in attitude of the wireless communications device, as described earlier.

The wireless communications device according to one or more embodiments of the present invention may be configured such that: the lower cutoff frequency of the first audio filter is 300 Hz; and the lower cutoff frequency of the second audio filter is 600 Hz.

According to the above configuration, when the tilt angle is equal to or greater than the threshold angle, the use of the second audio filter makes it possible to effectively prevent a deterioration of reception sensitivity.

The wireless communications device according to one or more embodiments of the present invention may be configured such that the selector is configured to carry out the selection based on the tilt angle only when a strength of a radio wave received by the wireless communications device is equal to or less than a predetermined threshold strength.

According to the above configuration, the selection based on the degree of change in attitude of the wireless communications device is carried out only when it appears better to reduce a deterioration of reception sensitivity (i.e., only when the strength of the radio wave is equal to or less than the threshold strength).

The wireless communications device according to one or more embodiments of the present invention may further include a squelch setter configured to set a squelch sensitivity for the second audio filter, the squelch setter being configured to cause the squelch sensitivity for the second audio filter to be higher when the following condition (i) is satisfied than when at least one of the following conditions (ii) and (iii) is satisfied: (i) the strength of the radio wave is equal to or less than the predetermined threshold strength and the tilt angle is equal to or greater than the predetermined threshold angle; (ii) the strength of the radio wave is greater than the predetermined threshold strength; (iii) the tilt angle is less than the predetermined threshold angle.

According to the above configuration, when it appears better to reduce a deterioration of reception sensitivity, the use of the second audio filter makes it possible to more effectively prevent the deterioration of reception sensitivity.

The wireless communications device according to one or more embodiments of the present invention may be configured such that the predetermined threshold angle is not less than 30° and not greater than 90°.

In a method of controlling a wireless communications device according to one or more embodiments of the present invention, the wireless communications device includes: an acceleration sensor configured to detect acceleration; and a first audio filter and a second audio filter which have respective different frequency characteristics, the second audio filter having a lower cutoff frequency that is higher than a lower cutoff frequency of the first audio filter, and the method includes: an angle calculating step including calculating, based on the acceleration, a tilt angle of the wireless communications device with respect to a vertical direction; and a selecting step including carrying out selection of which one of the first and second audio filters to operate, the selecting step including selecting the first audio filter if the tilt angle is less than a predetermined threshold angle, and selecting the second audio filter if the tilt angle is equal to or greater than the predetermined threshold angle.

The method of controlling a wireless communications device according to one or more embodiments of the present invention may be arranged such that the selecting step further includes a step of carrying out the selection based on the tilt angle only when a strength of a radio wave received by the wireless communications device is equal to or less than a predetermined threshold strength.

The method of controlling a wireless communications device according to one or more embodiments of the present invention may further include a squelch setting step including setting a squelch sensitivity for the second audio filter, the squelch setting step including causing the squelch sensitivity for the second audio filter to be higher when the following condition (i) is satisfied than when at least one of the following conditions (ii) and (iii) is satisfied: (i) the strength of the radio wave is equal to or less than the predetermined threshold strength and the tilt angle is equal to or greater than the predetermined threshold angle; (ii) the strength of the radio wave is greater than the predetermined threshold strength; (iii) the tilt angle is less than the predetermined threshold angle.

[Note]

One or more embodiments of the present invention are not limited to the embodiments, but can be altered by a skilled person in the art within the scope of the claims. One or more embodiments of the present invention also encompass, in its technical scope, any embodiment derived by combining technical means disclosed in differing embodiments.

REFERENCE SIGNS LIST

1 Transceiver (Wireless communications device)
11 Angle calculator
12 Selector
13 Received wave strength determiner
14 Squelch setter
31 First audio filter
32 Second audio filter
40 Acceleration sensor
θ Tilt angle θth Threshold angle
RSSIV Strength of radio wave
RSSIVth Threshold strength

The invention claimed is:

1. A wireless communications device comprising:
an acceleration sensor configured to detect acceleration;
an angle calculator configured to calculate, based on the acceleration, a tilt angle of the wireless communications device with respect to a vertical direction;
a first audio filter and a second audio filter which have respective different frequency characteristics, the second audio filter having a lower cutoff frequency that is higher than a lower cutoff frequency of the first audio filter; and
a selector configured to carry out selection of which one of the first and second audio filters to operate,
the selector being configured to
select the first audio filter if the tilt angle is less than a predetermined threshold angle, and
select the second audio filter if the tilt angle is equal to or greater than the predetermined threshold angle.

2. The wireless communications device according to claim 1, wherein:
the lower cutoff frequency of the first audio filter is 300 Hz; and
the lower cutoff frequency of the second audio filter is 600 Hz.

3. The wireless communications device according to claim 1, wherein the selector is configured to carry out the selection based on the tilt angle only when a strength of a radio wave received by the wireless communications device is equal to or less than a predetermined threshold strength.

4. The wireless communications device according to claim 3, further comprising a squelch setter configured to set a squelch sensitivity for the second audio filter,
the squelch setter being configured to cause the squelch sensitivity for the second audio filter to be higher when the following condition (i) is satisfied than when at least one of the following conditions (ii) and (iii) is satisfied:
(i) the strength of the radio wave is equal to or less than the predetermined threshold strength and the tilt angle is equal to or greater than the predetermined threshold angle;
(ii) the strength of the radio wave is greater than the predetermined threshold strength;
(iii) the tilt angle is less than the predetermined threshold angle.

5. The wireless communications device according to claim 1, wherein the predetermined threshold angle is not less than 30° and not greater than 90°.

6. A method of controlling a wireless communications device,
the wireless communications device including:
an acceleration sensor configured to detect acceleration; and
a first audio filter and a second audio filter which have respective different frequency characteristics, the second audio filter having a lower cutoff frequency that is higher than a lower cutoff frequency of the first audio filter,
the method comprising:
an angle calculating step comprising calculating, based on the acceleration, a tilt angle of the wireless communications device with respect to a vertical direction; and
a selecting step comprising carrying out selection of which one of the first and second audio filters to operate,
the selecting step comprising
selecting the first audio filter if the tilt angle is less than a predetermined threshold angle, and
selecting the second audio filter if the tilt angle is equal to or greater than the predetermined threshold angle.

7. The method according to claim 6, wherein the selecting step further comprises a step of carrying out the selection based on the tilt angle only when a strength of a radio wave received by the wireless communications device is equal to or less than a predetermined threshold strength.

8. The method according to claim 7, further comprising a squelch setting step comprising setting a squelch sensitivity for the second audio filter,
the squelch setting step comprising causing the squelch sensitivity for the second audio filter to be higher when the following condition (i) is satisfied than when at least one of the following conditions (ii) and (iii) is satisfied:
(i) the strength of the radio wave is equal to or less than the predetermined threshold strength and the tilt angle is equal to or greater than the predetermined threshold angle;
(ii) the strength of the radio wave is greater than the predetermined threshold strength;
(iii) the tilt angle is less than the predetermined threshold angle.

* * * * *